US012620529B1

(12) United States Patent
Yao et al.

(10) Patent No.: US 12,620,529 B1
(45) Date of Patent: May 5, 2026

(54) FERROELECTRIC-PIEZOELECTRIC CERAMIC ENERGY STORAGE MATERIALS, HYBRID PROCESS PREPARATION METHODS, AND USE THEREOF

(71) Applicant: TONGJI UNIVERSITY, Shanghai (CN)

(72) Inventors: Manwen Yao, Shanghai (CN); Cangjin Li, Shanghai (CN); Xi Yao, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 19/211,277

(22) Filed: May 18, 2025

(30) Foreign Application Priority Data

Jan. 8, 2025    (CN) ......................... 202510033909.5

(51) Int. Cl.
*H01G 13/04*          (2006.01)
*C04B 35/491*          (2006.01)
(Continued)

(52) U.S. Cl.
CPC ......... *H01G 4/1245* (2013.01); *C04B 35/491* (2013.01); *C04B 35/6261* (2013.01); *C04B 35/62635* (2013.01); *C04B 35/6264* (2013.01); *C04B 41/0063* (2013.01); *C04B 41/0072* (2013.01); *H01G 2/24* (2013.01); *H01G 13/04* (2013.01); *C04B 2235/3227* (2013.01);
(Continued)

(58) Field of Classification Search
None
See application file for complete search history.

(56) References Cited

FOREIGN PATENT DOCUMENTS

| CN | 111393149 A | * | 7/2020 | ........... C04B 35/622 |
| CN | 111548154 A | * | 8/2020 | ........... C04B 35/622 |

(Continued)

OTHER PUBLICATIONS

CN '630 translation (Year: 2018).*

(Continued)

*Primary Examiner* — Dion R. Ferguson
(74) *Attorney, Agent, or Firm* — PORUS IP LLC

(57) ABSTRACT

A ferroelectric-piezoelectric ceramic energy storage material and a hybrid process preparation method and use thereof are provided. The ferroelectric-piezoelectric ceramic energy storage material is prepared with micro-nano composite structured particles formed by uniformly mixing polycrystalline powder with sol followed by heat-treatment, the micro-nano composite structured particles including the polycrystalline powder and a nanoscale PLZS component layer distributed around the polycrystalline powder. The method includes preparing sol and polycrystalline powder; performing heat-treatment on the sol and the polycrystalline powder to obtain micro-nano composite structured particles; and obtaining a ferroelectric-piezoelectric ceramic energy storage material sample through a casting process and sintering. By mixing with sol components, the specific surface area and oxygen vacancy content are increased, which is beneficial for reducing the sintering temperature of ceramic materials and improving their dielectric energy storage performance.

8 Claims, 9 Drawing Sheets

(51) Int. Cl.

| | |
|---|---|
| *C04B 35/626* | (2006.01) |
| *C04B 41/00* | (2006.01) |
| *H01G 2/24* | (2006.01) |
| *H01G 4/12* | (2006.01) |

(52) U.S. Cl.

CPC ................. *C04B 2235/3232* (2013.01); *C04B 2235/3244* (2013.01); *C04B 2235/3293* (2013.01); *C04B 2235/3296* (2013.01); *C04B 2235/602* (2013.01); *C04B 2235/6567* (2013.01)

(56) References Cited

FOREIGN PATENT DOCUMENTS

| | | | | |
|---|---|---|---|---|
| CN | 111574198 A | | 8/2020 | |
| CN | 111718194 A | * | 9/2020 | ............... H01G 4/10 |
| CN | 111995391 A | | 11/2020 | |
| CN | 113429203 A | * | 9/2021 | ....... C04B 35/62605 |
| CN | 115947598 A | | 4/2023 | |
| CN | 119874356 A | * | 4/2025 | ............. C04B 35/64 |
| DE | 102016107405 A1 | | 10/2017 | |
| EP | 0731060 A1 | | 9/1996 | |
| JP | 3014379 B1 | | 2/2000 | |
| JP | 2014139132 A | * | 7/2014 | ............. C04B 35/00 |

OTHER PUBLICATIONS

CN '928 translation (Year: 2020).*
CN '149 translation (Year: 2020).*
CN '154 translation (Year: 2020).*
CN '194 translation (Year: 2020).*
CN '356 translation (Year: 2025).*
JP '132 translation (Year: 2014).*
Notification to Grant Patent Right for Invention in Chinese Application No. 202510033909.5 mailed on Sep. 22, 2025, 5 pages.
Zhu, Zaili et al., Study on Preparation and Electrical Properties of 0-3 PLZT/IPN Piezoelectric Composites, Journal of Synthetic Crystals, 38: 64-67, 2009.

* cited by examiner

FERROELECTRIC-PIEZOELECTRIC CERAMIC ENERGY STORAGE MATERIALS, HYBRID PROCESS PREPARATION METHODS, AND USE THEREOF

CROSS-REFERENCE TO RELATED APPLICATIONS

This application claims priority to Chinese Patent Application No. 202510033909.5, filed on Jan. 8, 2025, the contents of which are hereby incorporated by reference to its entirety.

TECHNICAL FIELD

The present disclosure relates to the technical field of ferroelectric-piezoelectric ceramic material, and in particular, to a ferroelectric-piezoelectric ceramic energy storage material, a hybrid process preparation method, and use thereof.

BACKGROUND

With the development of electronic information technology, ceramic capacitors, as an important electronic component, play an irreplaceable role in the electronics industry. Dielectric energy storage is an important application of ceramic capacitors, which places new demands on the performance of dielectric ceramic materials. Lead zirconate-based ferroelectric-piezoelectric ceramic energy storage materials have advantages such as high power density, fast discharge rate, and long service life, making them important candidate materials for pulse power electronic components. However, their application in electronic energy storage devices is limited by relatively low energy storage density and high sintering temperature, which results from the co-sintering process of dielectric ceramic materials with internal electrodes in multilayer ceramic capacitors requiring the ceramic materials to have sufficiently low sintering temperature. Taking the 70/30 palladium-silver electrode as an example, its annealing temperature is 1150° C., while the sintering temperature of lead zirconate-based energy storage ceramics is generally around 1300° C. Therefore, it is necessary to reduce the sintering temperature of lead zirconate-based ceramic materials.

At present, it is generally recognized that the addition of glass is an effective means of reducing the sintering temperature. In Chinese Patent Application No. 202010798450.5, the sintering temperature of lead-barium-lanthanum-zirconium-Tin ceramic doped with barium-borosilicate glass phase is reduced to 1050° C., and the energy storage density is increased to 6.3 J/cm³. In Chinese Patent Application No. 202211297267.2, by adding $BaCO_3$—$B_2O_3$—$SiO_2$—$K_2CO_3$ glass phase, the sintering temperature of the ceramic material with a chemical formula of $Pb_{0.95}La_{0.02}Sr_{0.02}$ $(Zr_{0.5}Sn_{0.4}Ti_{0.1})O_3$ is reduced from 1300° C. to 960° C., but its energy storage density is only 3.2 J/cm³. In these disclosures, the addition of glass is not very effective for the enhancement of energy storage properties, even reducing the dielectric constant of the materials.

For ferroelectric-piezoelectric ceramic energy storage materials or other functional ceramic materials, it is conducive to saving energy and lowering the production cost by reducing the sintering temperature. Therefore, it is an urgent technical problem about how to improve the performance of energy storage materials while reducing the sintering temperature.

SUMMARY

The purpose of the present disclosure is to provide a ferroelectric-piezoelectric ceramic energy storage material, a hybrid process preparation method, and use thereof. By mixing and calcining polycrystalline powder with sol, micro-nano composite structured particles are formed, which increases the specific surface area and oxygen vacancy content, thereby reducing the sintering temperature of the ceramic material and improving the dielectric energy storage performance of ceramic materials.

In order to realize the above purpose, the present disclosure provides a ferroelectric-piezoelectric ceramic energy storage material, comprising micro-nano composite structured particles formed by uniformly mixing polycrystalline powder with sol followed by heat-treatment, the micro-nano composite structured particles including the polycrystalline powder and a nanoscale PLZS component layer distributed around the polycrystalline powder.

In some embodiments, a weight ratio of the sol to the polycrystalline powder is (1-3):5.

In some embodiments, a chemical formula of the nanoscale PLZS component layer is $(Pb_{0.97}La_{0.02})$ $(Zr_{0.6}Sn_{0.4})O_3$.

In some embodiments, a chemical formula of the polycrystalline powder is $(Pb_{0.94}La_{0.04})$ $(Zr_{0.51}Sn_{0.47}Hf_{0.06}Ti_{0.01})O_3$.

In some embodiments, a hybrid process preparation method for a ferroelectric-piezoelectric ceramic energy storage material comprises: S1, preparing sol and polycrystalline powder, respectively; S2, mixing the sol and the polycrystalline powder, and removing organic matter by heat treatment to obtain micro-nano composite structured particles; S3, mixing the micro-nano composite structured particles with a solvent, a binder, a dispersant, and a plasticizer to obtain a casting slurry; S4, obtaining a thick film by defoaming and casting the casting slurry; S5, obtaining a ceramic green body by shearing, stacking, and hot pressing the thick film; and S6, obtaining a ferroelectric-piezoelectric ceramic energy storage material sample by performing binder removal and sintering on the ceramic green body.

In some embodiments, the solvent in S3 is a mixture of ethanol and trichloroethylene.

In some embodiments, the binder in S3 is polyvinyl butyral.

In some embodiments, the dispersant in S3 is triethyl phosphate.

In some embodiments, the plasticizer in S3 is dibutyl phthalate.

In some embodiments, a mass ratio of the micro-nano composite structured particles to the solvent, the binder, the dispersant, and the plasticizer is 20:20:2:0.4:0.8.

In some embodiments, in step S1, the sol is prepared by a process including: S111, weighing lead acetate, lanthanum acetate, zirconium n-propanol, and tin isopropanol; S112, dissolving the lead acetate and the lanthanum acetate in acetic acid, heating to 110° C. while stirring, and cooling to obtain a solution A; dissolving the zirconium n-propanol and the tin dioxide in ethylene glycol monomethyl ether, followed by mixing and stirring to obtain a mixture, introducing acetylacetone to the mixture and stirring uniformly to obtain a solution B; and S113, introducing the solution B into the solution A, and mixing and stirring uniformly to obtain a mixed solution, and adjusting a concentration, a pH, and a viscosity of the mixed solution by adding deionized water, the acetic acid, and the ethylene glycol sequentially, and after stirring, adjusting a volume of the mixed solution with the acetic acid to obtain clear sol.

In some embodiments, in S112, a molar ratio of the acetylacetone to PLZS in the sol is 1.1:1.

In some embodiments, in S113, the concentration of the mixed solution is in a range of 0.027 g/mL to 0.08 g/mL, the pH of the mixed solution is in a range of 3 to 5, and the viscosity of the mixed solution is in a range of 7 cP to 9 cP.

In some embodiments, in S1, the polycrystalline powder is prepared by a process including: S121, mixing lead tetroxide, lanthanum trioxide, zirconium dioxide, tin dioxide, hafnium dioxide, and titanium dioxide according to a stoichiometric ratio and performing a first ball milling to obtain a first mixture; S122, drying the first mixture, and pre-sintering the first mixture at a temperature of 900° C. with a holding time of 1 h to 3 h, and cooling the first mixture to room temperature in a furnace to obtain a pre-sintered mixture; and S123, performing a second ball milling on the pre-sintered mixture to obtain a second mixture, and drying the second mixture to obtain the polycrystalline powder.

In some embodiments, a time of the first ball milling is in a range of 20 h to 30 h; and in S123, a time of the second ball milling is in a range of 20 h to 30 h.

In some embodiments, in S2, a temperature of the heat treatment is 600° C., a holding time of the heat treatment is in a range of 5 h to 7 h, and the micro-nano composite structured particles are cooled to room temperature in a furnace.

In some embodiments, in S6, a temperature of the binder removal is 600° C., and a holding time of the binder removal is in a range of 7 h to 10 h, and the debinded ceramic green body is cooled to the room temperature in a furnace.

In some embodiments, in S6, a temperature of the sintering is in a range of 1100° C. to 1130° C.

In some embodiments, in S6, a holding time of the sintering is 3 h, and the sintered ceramic green body is cooled to room temperature in a furnace.

One or more embodiments of the present disclosure provide use of the ferroelectric-piezoelectric ceramic energy storage material prepared using the hybrid process preparation method in electronic functional materials and devices.

The beneficial effects of the ferroelectric-piezoelectric ceramic energy storage material, a hybrid process preparation method, and use thereof include, but are not limited to: (1) The present disclosure prepares the micro-nano composite structured materials by mixing the sol and the polycrystalline powder and removing organic matter. The sol effectively reduces the grain size of the sintered particles and improves the breakdown field strength. The composite ceramic material exhibits space charge polarization, and the introduced orthorhombic phase has a higher polarization strength, thereby increasing the dielectric constant. The ceramic material prepared through the hybrid process described in the present disclosure significantly enhances the energy storage density, which helps solve the volume limitation issue of energy storage capacitors. (2) The sintering temperature of the ferroelectric-piezoelectric ceramic energy storage material prepared through the hybrid process in the present disclosure is 1120° C., which is 180° C. lower than the sintering temperature of ceramics made without the sol. This reduction in the sintering temperature is beneficial for the co-firing of internal electrodes and ceramic materials at low temperatures in multilayer ceramic capacitors. The present disclosure lowers the sintering temperature of the ferroelectric-piezoelectric ceramic energy storage material to below 1150° C., which is the co-firing temperature of Ag—Pd electrode, making it highly significant for practical applications. (3) The hybrid process described in the present disclosure is simple, easy to repeat, does not require the introduction of large-scale equipment, has a low cost, and is suitable for mass production.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

DETAILED DESCRIPTION

Figure 1:
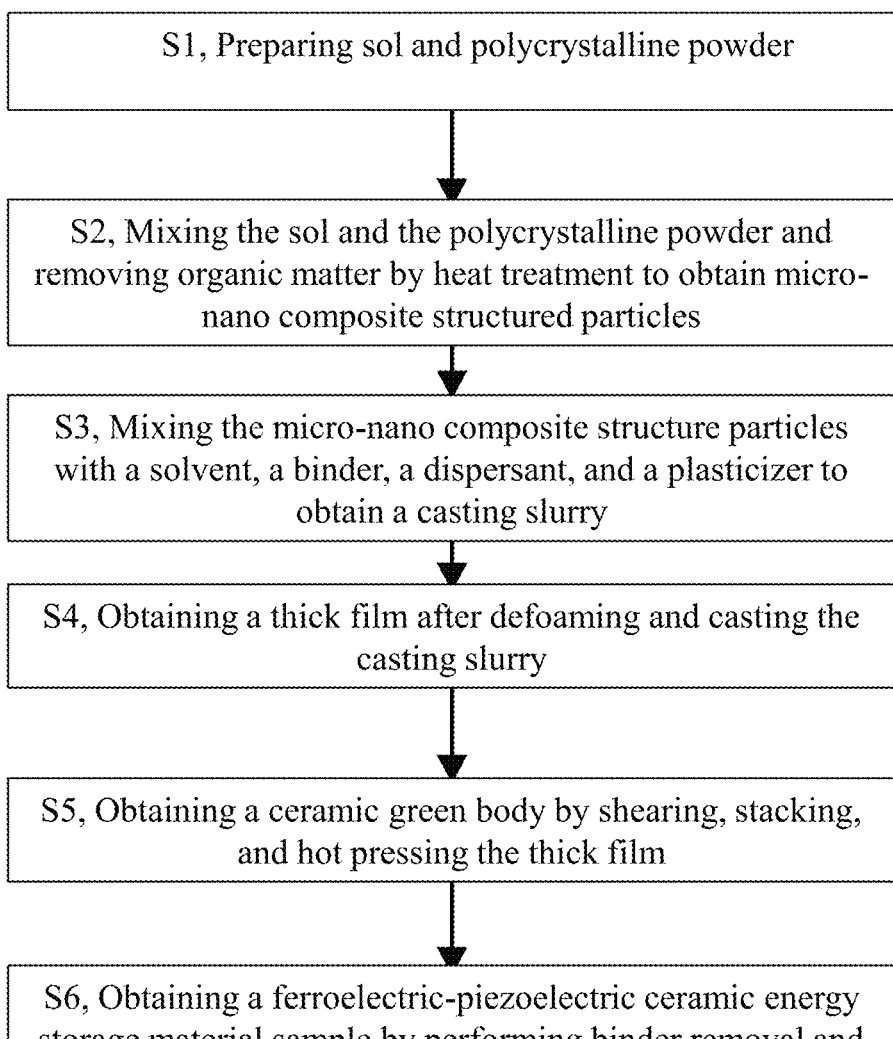
FIG. 1 is a flowchart illustrating a process of a hybrid process preparation method for the ferroelectric-piezoelectric ceramic energy storage material according to some embodiments of the present disclosure.

To more clearly illustrate the technical solutions of the embodiments of the present disclosure, the following will briefly introduce the accompanying drawings to be used in the description of the embodiments. Obviously, the accompanying drawings in the following description are only some examples or embodiments of the present disclosure, and a person of ordinary skill in the art may apply the present disclosure to other similar scenarios in accordance with these drawings without creative labor. Unless obviously obtained from the context or the context illustrates otherwise, the same numeral in the drawings refers to the same structure or operation.

As shown in the present disclosure and the claims, unless the context clearly suggests an exception, the words "a", "an", "one kind", and/or "the" do not refer specifically to the singular, but may also include the plural. Generally, the terms "including" and "comprising" suggest only the inclusion of clearly identified steps and elements that do not constitute an exclusive list, and the method or apparatus may also include other steps or elements.

Flowcharts are used in the present disclosure to illustrate operations performed by a system according to embodiments of the present disclosure. It should be appreciated that the preceding or following operations are not necessarily performed in an exact sequence. Instead, steps may be processed in reverse order or simultaneously. Also, it is possible to add other operations to these processes or remove a step or steps from these processes.

Embodiments of the present disclosure provide a ferroelectric-piezoelectric ceramic energy storage material. The ferroelectric-piezoelectric ceramic energy storage material is a ceramic material for energy storage.

In some embodiments, the ferroelectric-piezoelectric ceramic energy storage material includes micro-nano composite structured particles. The micro-nano composite structured particles include polycrystalline powder and a nanoscale PLZS component layer distributed around the polycrystalline powder.

The polycrystalline powder is polycrystalline raw material powder used to prepare the ferroelectric-piezoelectric ceramic energy storage material.

In some embodiments, the polycrystalline powder may include one or more metal oxides such as metal oxides of lead, lanthanum, zirconium, tin, hafnium, titanium, or the like.

In some embodiments, a chemical formula of the polycrystalline powder is $(Pb_{0.94}La_{0.04})(Zr_{0.51}Sn_{0.47}Hf_{0.0]}Ti_{0.01})O_3$.

In some embodiments of the present disclosure, the material properties of the polycrystalline powder may be further optimized by setting the ratio of the components in the polycrystalline powder, thereby enhancing the energy storage capacity of the ferroelectric-piezoelectric ceramic energy storage material.

The polycrystalline powder is a tetragonal phase material characterized by X-ray diffraction. Its polarization strength and breakdown field strength are relatively low, and the sintering temperature is higher than 1300° C. To reduce the sintering temperature of the polycrystalline powder, it is necessary to add sol to fully mix and disperse the polycrystalline powder before heat treatment.

The sol is used to fully mix and disperse the polycrystalline powder. In some embodiments, the sol may include metal-organic salts, solvents, and other types of additives (e.g., pH adjusters, thickeners, co-solvents, chelating agents), or the like.

In some embodiments, a weight ratio of the sol to the polycrystalline powder is (1-3):5.

In some embodiments, the weight ratio of the sol to the polycrystalline powder may also be one of 1:5, 1.5:5, 2:5, 2.5:5, or 3:5.

In some embodiments, the weight ratio of the sol to the polycrystalline powder may also be one of (1-1.5):5, (1-2):5, (1-2.5):5, (1-3):5, (1.5-2):5, (1.5-2.5):5, (1.5-3):5, (2-2.5):5, (2-3):5, or (2.5-3):5.

In some embodiments of the present disclosure, by setting the weight ratio of the sol to the polycrystalline powder, it can effectively control the distribution uniformity of the polycrystalline powder in the ferroelectric-piezoelectric ceramic energy storage material, and effectively reduce a temperature of the heat treatment after the polycrystalline powder and the sol are uniformly mixed.

More content on preparing the sol may be referred to the related description below.

The micro-nano composite structured particles are used as an intermediate for preparing the ferroelectric-piezoelectric ceramic energy storage material.

In some embodiments, the micro-nano composite structured particles may be formed by uniformly mixing the polycrystalline powder with the sol followed by heat-treatment. The micro-nano composite structured particles include the polycrystalline powder and the nanoscale PLZS component layer distributed around the polycrystalline powder.

The nanoscale PLZS component layer is a thin layer structure containing lead, lanthanum, zirconium, tin, and other metal components. The nanoscale PLZS component layer may disperse and isolate the polycrystalline powder.

In some embodiments, a chemical formula of the nanoscale PLZS component layer is $(Pb_{0.97}La_{0.02})(Zr_{0.6}Sn_{0.4})O_3$.

In some embodiments of the present disclosure, setting the composition ratio of the nanoscale PLZS component layer can optimize the polarization strength of the micro-nano composite structured particles, thereby enhancing the energy storage performance of the ferroelectric-piezoelectric ceramic energy storage material.

In some embodiments, the nanoscale PLZS component layer in the ferroelectric-piezoelectric ceramic energy storage material obtained by the heat treatment is an orthorhombic phase material with a higher polarization strength, which results in a much higher energy storage density of the ferroelectric-piezoelectric ceramic energy storage material.

Some embodiments of the present disclosure further provide a hybrid process method for the ferroelectric-piezoelectric ceramic energy storage material. FIG. 1 is a flowchart illustrating a process of a hybrid process preparation method for the ferroelectric-piezoelectric ceramic energy storage material according to some embodiments of the present disclosure. As shown in FIG. 1, the method comprises following steps.

S1, preparing sol and polycrystalline powder, respectively.

More information about the sol and the polycrystalline powder may be found in the related content above.

In some embodiments, the sol may be prepared in a variety of ways. For example, raw materials such as metal-organic salts containing lead, lanthanum, zirconium, and tin may be added to a solvent for dissolution. After the raw materials are fully dissolved, thickeners are added to increase the viscosity of the solvent, resulting in an initial gel. The parameters of the initial gel (e.g., pH, etc.) are adjusted by adding additives (e.g., pH adjusters, etc.), and the sol is obtained after the adjustment is completed.

In some embodiments, the sol is prepared by steps S111 to S113 as follows.

S111, weighing lead acetate, lanthanum acetate, zirconium n-propanol, and tin isopropanol according to a stoichiometric ratio.

In some embodiments, when the chemical formula of the sol is $(Pb_{0.97}La_{0.02})(Zr_{0.6}Sn_{0.4})O_3$, a molar ratio of the weighed lead acetate, lanthanum acetate, zirconium n-propanol, and tin isopropanol is 97:2:6:4.

S112, dissolving the lead acetate and the lanthanum acetate in acetic acid, heating to 110° C. and stirring, and cooling to obtain a solution A; dissolving the zirconium n-propanol and the tin dioxide in ethylene glycol monomethyl ether and mixing and stirring to obtain a mixture, introducing acetylacetone to the mixture and stirring uniformly to obtain a solution B.

In some embodiments, the acetylacetone is added to the solution B as a chelating agent, and a molar ratio of the acetylacetone to the PLZS in the sol is 1.1:1.

S113, introducing the solution B into the solution A, mixing and stirring uniformly to obtain a mixed solution, and adjusting a concentration, a pH, and a viscosity of the mixed solution by adding deionized water, the acetic acid, and the ethylene glycol sequentially, and after stirring, adjusting a volume of the mixed solution with the acetic acid to obtain clear sol. The concentration of the mixed solution is in a range of 0.027 g/mL to 0.08 g/mL, the pH of the mixed solution is in a range of 3 to 5, and the viscosity of the mixed solution is in a range of 7 cP to 9 cP.

In some embodiments, the concentration of the mixed solution may also be one of a range of 0.027 g/mL to 0.034 g/mL, a range of 0.027 g/mL to 0.041 g/mL, a range of 0.027 g/mL to 0.048 g/mL, a range of 0.034 g/mL to 0.053 g/mL, a range of 0.041 g/mL to 0.062 g/mL, a range of 0.048 g/mL to 0.069 g/mL, a range of 0.053 g/mL to 0.076 g/mL, or a range of 0.062 g/mL to 0.08 g/mL, etc.

In some embodiments, the concentration of the sol may also one of 0.027 g/mL, 0.034 g/mL, 0.041 g/mL, 0.048 g/mL, 0.053 g/mL, 0.062 g/mL, 0.069 g/mL, 0.076 g/mL, or 0.08 g/mL, etc.

In some embodiments, the pH of the sol may be 3.0, 3.5, 4.0, 4.5, or 5.0.

In some embodiments, the pH of the sol may also be one of a range of 3.0 to 3.5, a range of 3.0 to 4.0, a range of 3.0 to 4.5, a range of 3.5 to 4.5, or a range of 3.5 to 5.0, etc.

In some embodiments, the viscosity of the sol may be one of 7.0 cP, 7.5 cP, 8.0 cP, 8.5 cP, or 9.0 cP, etc.

In some embodiments, the viscosity of the sol may be one of a range of 7.0 cP to 7.5 cP, a range of 7.0 cP to 8.0 cP, a range of 7.0 cP to 8.5 cP, a range of 7.5 cP to 8.5 cP, a range of 7.5 cP to 9.0 cP, etc.

In some embodiments of the present disclosure, the acetylacetone may be chelated with metal ions such as a zirconium ion. The acetylacetone coordinates with zirconium ions to control the hydrolysis rate of the metal ions, allowing the hydrolysis process to proceed more uniformly and slowly. This prevents the rapid hydrolysis of the metal ions from producing precipitates and facilitates the formation of a stable sol system. The acetylacetone can also improve the stability of the sol, reduce particle agglomeration, and enhance the dispersibility of the prepared sol.

In some embodiments, the polycrystalline powder may be prepared in a variety of ways. For example, raw materials such as metal inorganic salts may be crushed and thoroughly mixed. After mixing, the raw materials may be calcined to obtain a sintered mixture with adhesion and agglomeration. The polycrystalline powder may be prepared by secondary crushing and drying.

In some embodiments, the polycrystalline powder is prepared by steps S121 to S123 below.

S121, mixing lead tetroxide, lanthanum trioxide, zirconium dioxide, tin dioxide, hafnium dioxide, and titanium dioxide according to a stoichiometric ratio and performing a first ball milling to obtain a first mixture.

In some embodiments, the first ball milling may be wet ball milling, with zirconium dioxide as the grinding ball and alcohol as the medium.

In some embodiments, a time of the first ball milling is in a range of 20 h to 30 h. In some embodiments, the time of the first ball milling may also be one of 20 h, 22 h, 24 h, 26 h, 28 h, or 30 h, etc.

In some embodiments, the time of the first ball milling may also be one of a range of 20 h to 24 h, a range of 20 h to 26 h, a range of 20 h to 28 h, a range of 20 h to 30 h, a range of 22 h to 26 h, a range of 22 h to 28 h, a range of 22 h to 30 h, a range of 24 h to 28 h, a range of 24 h to 30 h, or a range of 26 h to 30 h.

In some embodiments, when the chemical formula of the polycrystalline powder is $(Pb_{0.94}La_{0.04})(Zr_{0.51}Sn_{0.47}Hf_{0.06}Ti_{0.01})O_3$, a molar ratio of the weighed lead tetroxide, lanthanum trioxide, zirconium dioxide, tin dioxide, hafnium dioxide, and titanium dioxide is 31.33:2:51:47:1:1.

S122, drying the first mixture, pre-sintering the first mixture, and cooling the first mixture to room temperature in a furnace to obtain a pre-sintered mixture. A temperature of the pre-sintering is 900° C., and a holding time of the pre-sintering is 3 h.

S123, performing a second ball milling on the pre-sintered mixture to obtain a second mixture, and drying the second mixture to obtain the polycrystalline powder.

In some embodiments, in the second ball milling, zirconium dioxide is used as the grinding ball, and the alcohol is used as the medium.

In some embodiments, a time of the second ball milling is in a range of 20 h to 30 h.

In some embodiments, the time of the second ball milling time may also be one of 20 h, 22 h, 24 h, 26 h, 28 h, or 30 h, etc.

In some embodiments, the time of the second ball milling time may also be one of a range of 20 h to 24 h, a range of 20 h to 26 h, a range of 20 h to 28 h, a range of 20 h to 30 h, a range of 22 h to 26 h, a range of 22 h to 28 h, a range of 22 h to 30 h, a range of 24 h to 28 h, a range of 24 h to 30 h, or a range of 26 h to 30 h.

In some embodiments, the second ball milling may be wet ball milling. The mixture obtained after the second ball milling is dried and sieved through a 150 mesh sieve to obtain micrometer-scale polycrystalline powder.

By performing a ball milling on the metal oxide raw materials before and after the pre-sintering, the raw materials may be thoroughly mixed while ensuring that particles of the polycrystalline powder are sufficiently fine, thereby obtaining the micrometer-scale polycrystalline powder.

S2, mixing the sol and the polycrystalline powder and removing organic matter by heat treatment to obtain micro-nano composite structured particles.

In some embodiments, a method for mixing the sol and the polycrystalline powder may be wet ball milling as described above. A duration of the ball milling may be determined according to actual application scenarios and needs, for example, 24 h. The mixture may be obtained by drying after the ball milling is completed.

In some embodiments, the organic matter in the mixture is removed by heat treatment to obtain the micro-nano composite structured particles. More information about the micro-nano composite structured particles may be found in the related description above.

In some embodiments, a temperature of the heat treatment and a holding time of the heat treatment may be determined according to actual application scenarios and needs.

In some embodiments, the temperature of the heat treatment is 600° C. and the holding time of the heat treatment is in a range of 5 h to 7 h. After the heat treatment is completed, the mixture is cooled to room temperature in a furnace.

In some embodiments, the holding time of the heat treatment may also be one of a range of 5.0 h to 5.5 h, a range of 5.0 h to 6.0 h, a range of 5.0 h to 6.5 h, a range of 5.5 h to 6.0 h, a range of 5.5 h to 6.5 h, a range of 5.5 h to 7.0 h, a range of 6.0 h to 6.5 h, or a range of 6.0 h to 7.0 h, etc.

In some embodiments, the holding time of the heat treatment may also be one of 5.0 h, 5.5 h, 6.0 h, 6.5 h, or 7.0 h.

In some embodiments of the present disclosure, the lead zirconate-based particles are dispersed in the organic sol, and by setting the temperature and the holding time of the heat treatment, the organic matter may be removed at a relatively low temperature of 600° C., preventing the growth of lead zirconate-based particles in the sol.

S3, mixing the micro-nano composite structured particles with a solvent, a binder, a dispersant, and a plasticizer to obtain a casting slurry.

In some embodiments, the specific types of the solvent, the binder, the dispersant, and the plasticizer may be determined based on actual application scenarios and needs.

In some embodiments, the solvent is a mixture of ethanol and trichloroethylene, the binder is polyvinyl butyral, the dispersant is triethyl phosphate, and the plasticizer is dibutyl phthalate. A mass ratio of the micro-nano composite structured particles to the solvent, the binder, the dispersant, and the plasticizer is 20:20:2:0.4:0.8.

In some embodiments, before mixing, the micro-nano composite structured particles may be subjected to preliminary crushing such as the ball milling, to improve the uniformity of mixing of the micro-nano composite structured particles.

In some embodiments, the micro-nano composite structured particles are mixed with the ethanol, the trichloroethylene, and the triethyl phosphate and roll grinding is performed for 4 h to obtain a homogeneous and stable slurry. The polyvinyl butyral and the dibutyl phthalate are then added to the slurry and roll grinding is performed for 2 h to obtain the casting slurry. The casting slurry refers to a modified slurry that has undergone thickening and viscosity adjustment, enabling it to be uniformly coated to cast into films.

In some embodiments, the ratio of the micro-nano composite structured particles to the solvent, the binder, the dispersant, and the plasticizer may also be determined based on actual application scenarios and needs.

S4, obtaining a thick film by defoaming and casting the casting slurry.

In some embodiments, a time of the defoaming may be determined based on actual application scenarios and needs. For example, the time of the defoaming may be 5 min.

S5, obtaining a ceramic green body by shearing, stacking, and hot pressing the thick film;

In some embodiments, parameters such as a shearing size of the thick film, a number of stacked layers, and a temperature of the hot pressing may be determined based on actual application scenarios and needs.

S6, obtaining a ferroelectric-piezoelectric ceramic energy storage material sample by performing binder removal and sintering on the ceramic green body.

The binder removal is an operation that removes the binder, the dispersant, and other organic matter from the ceramic green body by heat treatment.

In some embodiments, the binder removal may also be performed by thermal decomposition. A temperature of the binder removal and a holding time of the binder removal in the thermal decomposition may be determined according to the actual application scenarios and needs.

In some embodiments, the temperature of the binder removal is 600° C., and the holding time of the binder removal is in a range of 7 h to 10 h. After the binder removal is completed, the ceramic green body is cooled to room temperature in a furnace.

In some embodiments, the holding time of the binder removal may be one of a range of 7 h to 8 h, a range of 7 h to 9 h, a range of 8 h to 9 h, a range of 8 h to 10 h, or a range of 9 h to 10 h.

In some embodiments, the holding time of the binder removal may be one of 7 h, 8 h, 9 h, or 10 h, etc.

In some embodiments, the temperature of the sintering is in a range of 1100° C. to 1130° C., and the holding time of the sintering is 3 h. The ferroelectric-piezoelectric ceramic energy storage material obtained after completion of sintering is cooled to room temperature in a furnace.

In some embodiments, the temperature of the sintering may also be one of a range of 1100° C. to 1125° C., a range of 1100° C. to 1130° C., a range of 1105° C. to 1125° C., a range of 1105° C. to 1130° C., a range of 1110° C. to 1130° C., a range of 1115° C. to 1130° C., a range of 1100° C. to 1115° C., or a range of 1120° C. to 1130° C., etc.

In some embodiments, the temperature of the sintering may also be one of 1100° C., 1105° C., 1110° C., 1115° C., 1120° C., 1125° C., or 1130° C., etc.

In some embodiments of the present disclosure, by setting parameters such as the temperature of the binder removal, the holding time of the binder removal, the temperature of the sintering, the holding time of the sintering, or the like, the ceramic green body may be subjected to the binder removal and the sintering at a lower temperature, thereby saving energy to reduce the production cost.

The ferroelectric-piezoelectric ceramic energy storage material provided in some embodiments of the present disclosure, a hybrid process preparation method for the ferroelectric-piezoelectric ceramic energy storage material, and use thereof are further described below by taking some embodiments and a comparison embodiment as examples.

Embodiment 1

Chemical formulas of sol and polycrystalline powder were $(Pb_{0.97}La_{0.02})(Zr_{0.6}Sn_{0.4})O_3$ and $(Pb_{0.94}La_{0.04})(Zr_{0.51}Sn_{0.47}Hf_{0.06}Ti_{0.01})O_3$, respectively. A concentration of the sol was 0.027 g/mL and a volume of the sol was 150 mL. A weight of the polycrystalline powder was 20 g. A weight ratio of the sol to the polycrystalline powder was 1:5.

A hybrid process preparation method for a ferroelectric-piezoelectric ceramic energy storage material included following steps.

S1, powders of $Pb_3O_4$, $La_2O_3$, $ZrO_2$, $SnO_2$, $HfO_2$, and $TiO_2$ were weighed according to a stoichiometric ratio, mixed by wet ball milling, ball milled for 24 h, and dried to obtain a mixture, then the obtained mixture was sintered at 900° C. with a holding time of 2 h to obtain a pre-sintered mixture. The pre-sintered mixture was subjected to a second ball milling and dried after the ball milling for 24 h to obtain the polycrystalline powder.

Lead acetate, lanthanum acetate, zirconium n-propanol, and tin isopropanol were weighed according to a stoichiometric ratio, and the lead acetate and the lanthanum acetate were dissolved in acetic acid, heated to 110° C., mixed and stirred, and cooled for 2 h to obtain a solution A. The zirconium n-propanol and the tin dioxide were dissolved in ethylene glycol monomethyl ether and mixed and stirred for 2 h to obtain a mixture, and then acetylacetone was introduced into the mixture and stirred and mixed to obtain a solution B, and a molar ratio of the acetylacetone to lead zirconate-based sol was 1.1:1. The solution B was introduced into the solution A and mixed and stirred uniformly to obtain a mixed solution, and deionized water, the acetic acid, and the ethylene glycol were sequentially added to the mixed solution to adjust a concentration, a pH, and a viscosity of the mixed solution, and after stirring for 2 h, a volume of the mixed solution was adjusted with the acetic acid to obtain clear sol with a concentration of 0.027 g/mL, a pH of 4, and a viscosity of 8 cP.

S2, 20 g of the polycrystalline powder was mixed with 150 mL of the sol and ball milled for 24 h to obtain a mixture. The mixture was dried and held at 600° C. for 6 h, and organic matter in the mixture was removed by heat treatment to obtain micro-nano composite structured particles.

S3, the micro-nano composite structured particles, ethanol, trichloroethylene, and triethyl phosphate were mixed and roller milled for 4 h to obtain a homogeneous and stable slurry, and then polyvinyl butyral, dibutyl phthalate, and polyethylene glycol were added to the slurry and roller milled for 2 h to obtain a casting slurry.

S4, a thick film was obtained by defoaming and casting the casting slurry.

S5, the green sheet was pressed into shape, then heated to 600° C. and heat-treated for 8 h to remove organic matter to obtain a ceramic green body.

S6, a ferroelectric-piezoelectric ceramic energy storage material sample was obtained by sintering the ceramic green body at a temperature of 1120° C. for 3 h.

Embodiment 2

Chemical formulas of sol and polycrystalline powder were $(Pb_{0.97}La_{0.02})(Zr_{0.6}Sn_{0.4})O_3$ and $(Pb_{0.94}La_{0.04})(Zr_{0.51}Sn_{0.47}Hf_{0.06} Ti_{0.01})O_3$, respectively. A concentration of the sol was 0.053 g/mL and a volume of the sol was 150 mL. A weight of the polycrystalline powder was 20 g. A weight ratio of the sol to the polycrystalline powder was 2:5.

A hybrid process preparation method for a ferroelectric-piezoelectric ceramic energy storage material was the same as the method in Embodiment 1 and may be referred to the related description above.

Embodiment 3

Chemical formulas of sol and polycrystalline powder were $(Pb_{0.97}La_{0.02})(Zr_{0.6}Sn_{0.4})O_3$ and $(Pb_{0.94}La_{0.04})(Zr_{0.51}Sn_{0.47}Hf_{0.0}]Ti_{0.01})O_3$, respectively. A concentration of the sol was 0.08 g/mL and a volume of the sol was 150 mL. A weight of the polycrystalline powder was 20 g. A weight ratio of the sol to the polycrystalline powder was 3:5.

A hybrid process preparation method for a ferroelectric-piezoelectric ceramic energy storage material was the same as the method in Embodiment 1 and may be referred to the related description above.

Comparison Embodiment 1

In comparison embodiment 1, an amount of sol was 0, and the ceramic was made solely from calcined polycrystalline powder with a chemical formula of $(Pb_{0.94}La_{0.04})(Zr_{0.51}Sn_{0.47}Hf_{0.06}Ti_{0.01})O_3$.

A hybrid process preparation method for a ferroelectric-piezoelectric ceramic energy storage material included following steps.

Powders of $Pb_3O_4$, $La_2O_3$, $ZrO_2$, $SnO_2$, $HfO_2$, and $TiO_2$ were weighed according to a stoichiometric ratio, mixed by wet ball milling, and dried after the ball milling for 24 h to obtain a mixture. The mixture was sintered at 900° C. with a holding time of 2 h to obtain a pre-sintered mixture. The pre-sintered mixture was subjected to a second ball milling, and dried after the ball milling for 24 h to obtain the polycrystalline powder.

The polycrystalline powder and ethanol, trichloroethylene, and triethyl phosphate were mixed and roller milled for 4 h to obtain a homogeneous and stable slurry, and then polyvinyl butyral, dibutyl phthalate, and polyethylene glycol were added to the slurry, and roller milled for 2 h to obtain a casting slurry.

The casting slurry was defoamed through vacuuming for 5 min, and it was scraped with a scraper to obtain a green sheet.

The green sheet was pressed into shape, then heated to 600° C. and heat-treated for 8 h to remove organic matter to obtain a ceramic green body.

A ceramic material was obtained by sintering the ceramic green body at a temperature of 1300° C. for 3 h.

Figure 2:
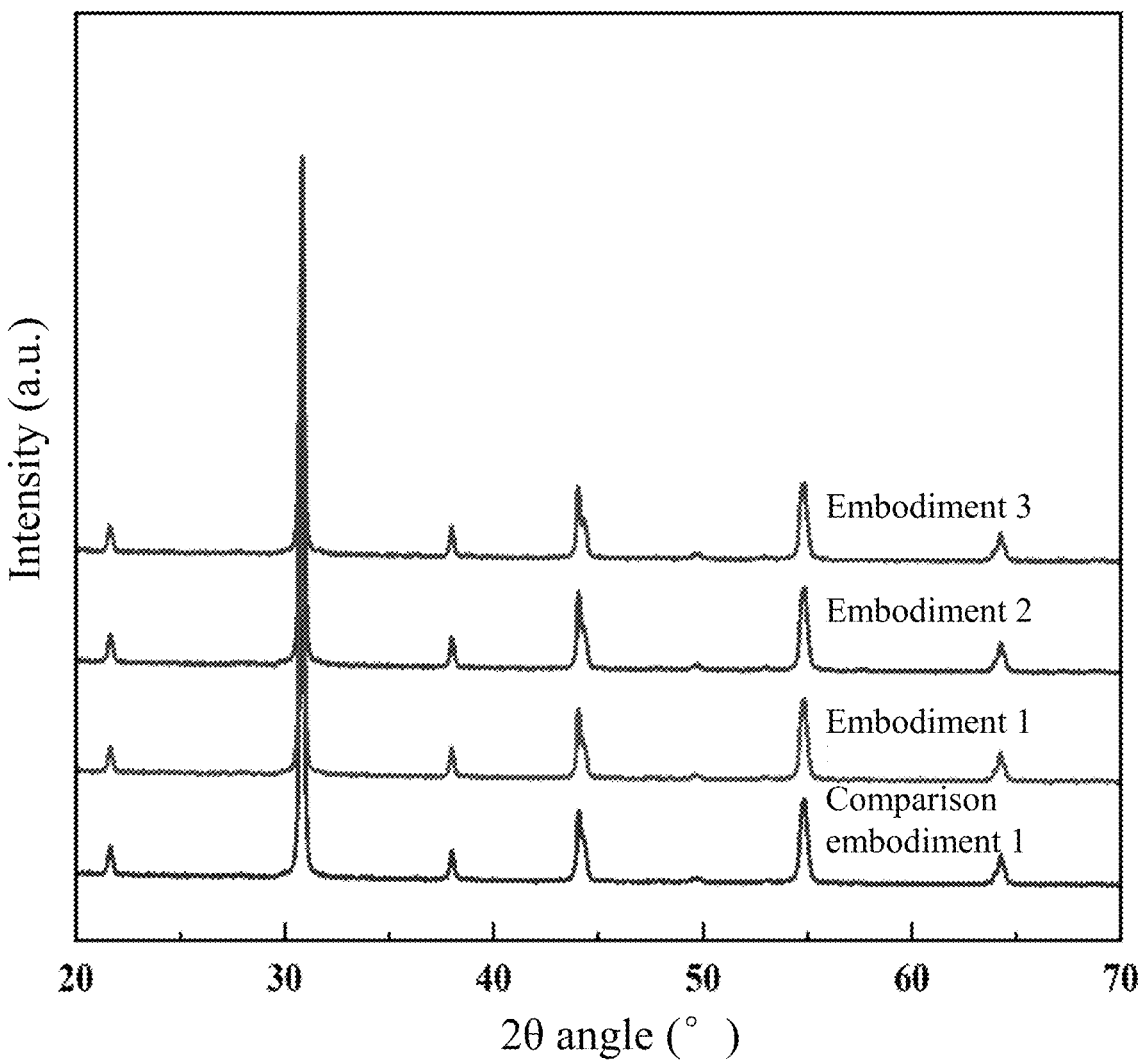
FIG. 2 is an X-ray diffraction (XRD) pattern of ferroelectric-piezoelectric ceramic energy storage material samples obtained in embodiments 1 to 3 and a ceramic material obtained in comparison embodiment 1 according to some embodiments of the present disclosure.

The ferroelectric-piezoelectric ceramic energy storage material samples obtained in embodiments 1 to 3 and the ceramic material obtained in comparison embodiment 1 were subjected to X-ray diffraction (XRD) analysis, and results are shown in FIG. 2. The ceramic material in comparison embodiment 1 is a tetragonal perovskite phase. The ferroelectric-piezoelectric ceramic energy storage material in embodiment 1 is a pure perovskite phase, primarily in a tetragonal phase, but contains a small amount of orthorhombic phase compared to the ceramic material in comparison embodiment 1. The ferroelectric-piezoelectric ceramic energy storage material in embodiment 2 is a pure perovskite phase, primarily in a tetragonal phase, but contains a larger amount of orthorhombic phase compared to the ferroelectric-piezoelectric ceramic energy storage material in Embodiment 1. The ferroelectric-piezoelectric ceramic energy storage material in embodiment 3 is a pure perovskite phase, primarily in a tetragonal phase, but contains the largest amount of orthorhombic phase.

Figure 3:
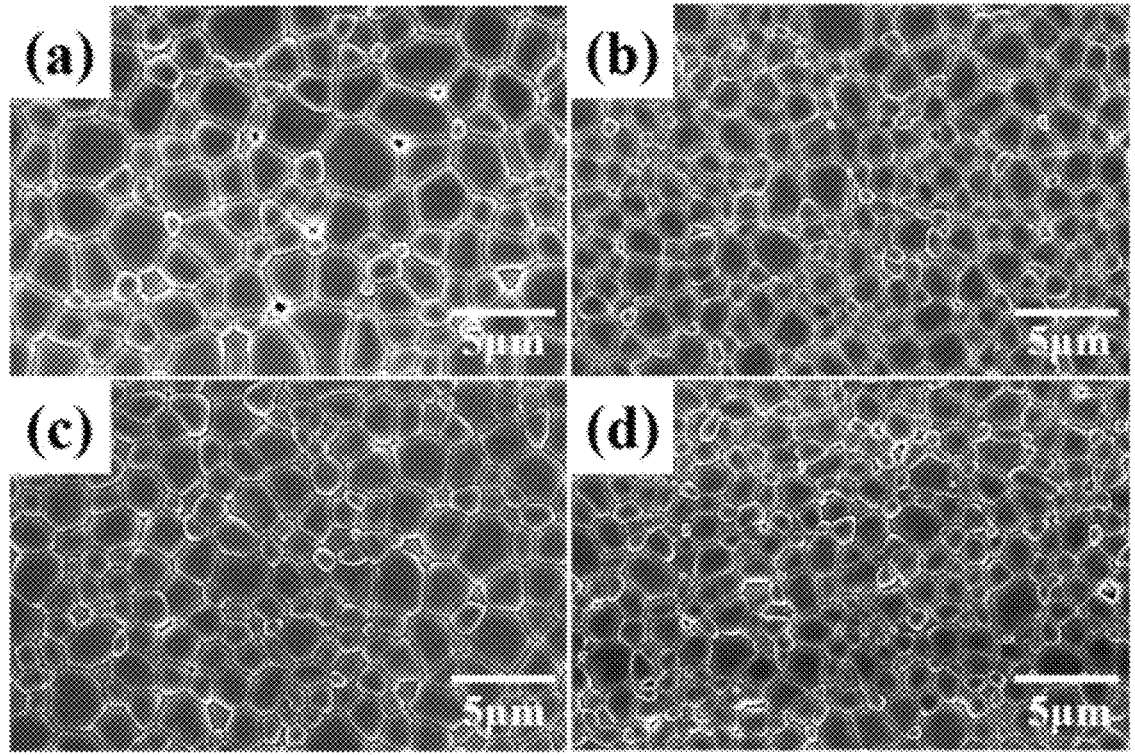
FIG. 3 is scanning electron microscope (SEM) images of ferroelectric-piezoelectric ceramic energy storage material samples obtained in embodiments 1 to 3 and a ceramic material obtained in comparison embodiment 1 according to some embodiments of the present disclosure, where (a) shows an SEM image of the ceramic material obtained in comparison embodiment 1; (b) shows an SEM image of the ferroelectric-piezoelectric ceramic energy storage material sample obtained in embodiment 1; (c) shows an SEM image of the ferroelectric-piezoelectric ceramic energy storage material obtained in embodiment 2; and (d) shows an SEM image of the ferroelectric-piezoelectric ceramic energy storage material obtained in embodiment 3.

The ferroelectric-piezoelectric ceramic energy storage material samples obtained in embodiments 1 to 3 and the ceramic material obtained in comparison embodiment 1 were analyzed using a scanning electron microscope (SEM), and results are shown in FIG. 3. A grain size of the ceramic material in comparison embodiment 1 is relatively large with a small number of holes. A grain size of the ferroelectric-piezoelectric ceramic energy storage material in embodiment 1 is smaller than the ceramic material in comparison embodiment 1, with no obvious holes. A grain size of the ferroelectric-piezoelectric ceramic energy storage material in embodiment 2 is smaller than the ferroelectric-piezoelectric ceramic energy storage material in embodiment 1, with no obvious holes. A grain size of the ferroelectric-piezoelectric ceramic energy storage material in embodiment 3 is the smallest, with a few holes.

Figure 4:
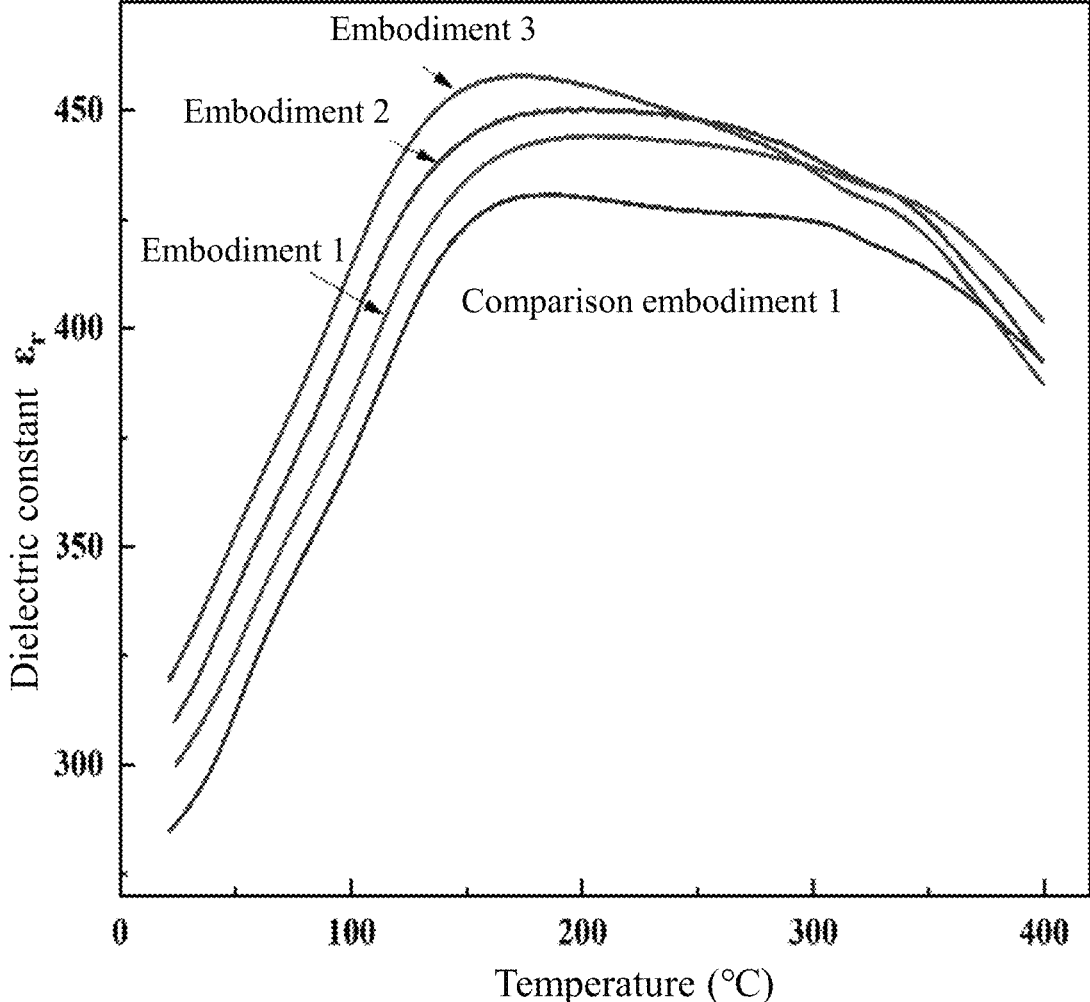
FIG. 4 is a dielectric constant-temperature curve of ferroelectric-piezoelectric ceramic energy storage material samples obtained in embodiments 1 to 3 and a ceramic material obtained in comparison embodiment 1 according to some embodiments of the present disclosure.

FIG. 4 is a dielectric constant-temperature curve of ferroelectric-piezoelectric ceramic energy storage material samples obtained in embodiments 1 to 3 and a ceramic material obtained in comparison embodiment 1 according to some embodiments of the present disclosure. The results show that the ceramic material in comparison embodiment 1 has a lower dielectric constant than the ferroelectric-piezoelectric ceramic energy storage materials in embodiments 1 to 3, and exhibits a relatively wide dielectric peak in the temperature range of 150° C. to 360° C., which is a typical characteristic of phase transition dispersion behavior. The ferroelectric-piezoelectric ceramic energy storage material in embodiment 1 has a higher dielectric constant than the ceramic material in comparison embodiment 1 and exhibits a relatively wide dielectric peak in the temperature range 150° C. to 360° C., but has a lower phase transition dispersion behavior than the ceramic material in comparison embodiment 1. The ferroelectric-piezoelectric ceramic energy storage material in embodiment 2 has a higher dielectric constant than the ferroelectric-piezoelectric ceramic energy storage material in embodiment 1 and exhibits a relatively wide dielectric peak in the temperature range of 150° C. to 360° C., but has a lower phase transition dispersion behavior than the ferroelectric-piezoelectric ceramic energy storage material in embodiment 1. The ferroelectric-piezoelectric ceramic energy storage material in embodiment 3 has the highest dielectric constant and exhibits a relatively wide dielectric peak in the temperature range of 150° C. to 360° C., but has the lowest phase transition dispersion behavior.

Figure 5:
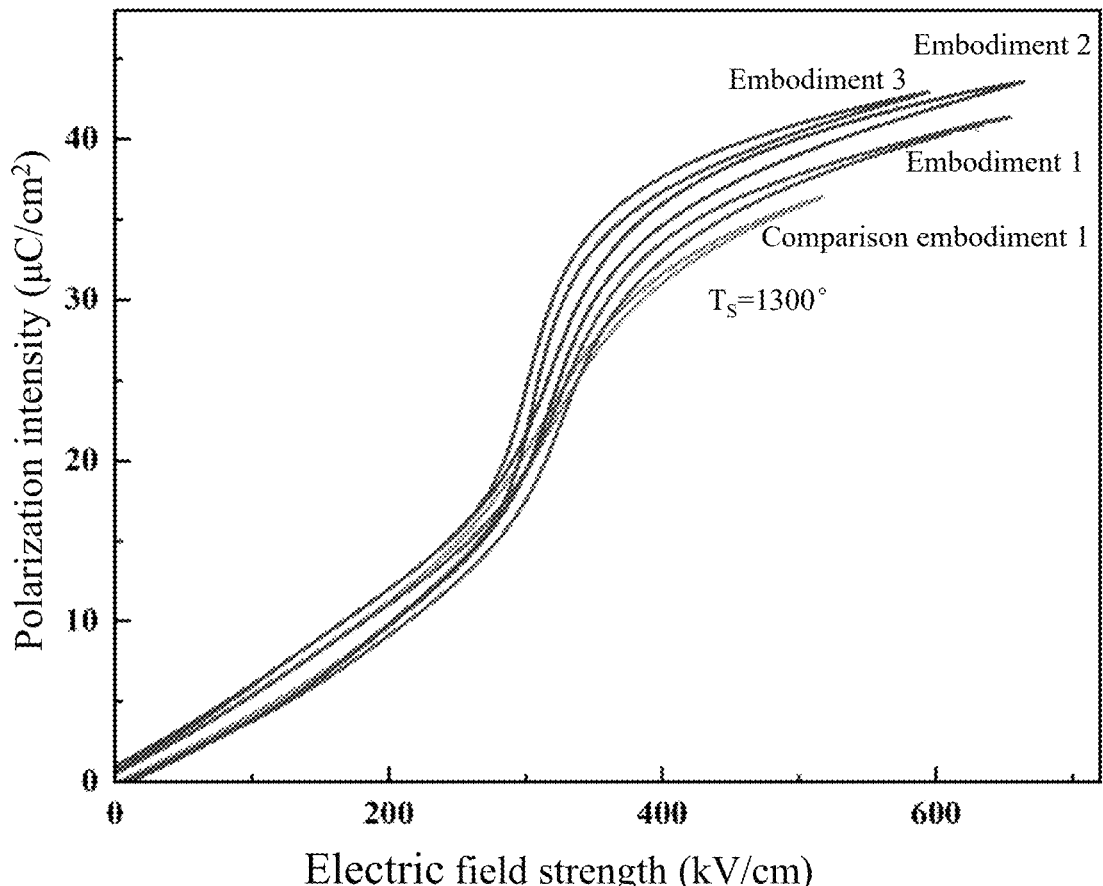
FIG. 5 is a room temperature hysteresis loop diagram of ferroelectric-piezoelectric ceramic energy storage material samples obtained in embodiments 1 to 3 and a ceramic material obtained in comparison embodiment 1 according to some embodiments of the present disclosure.
Figure 6:
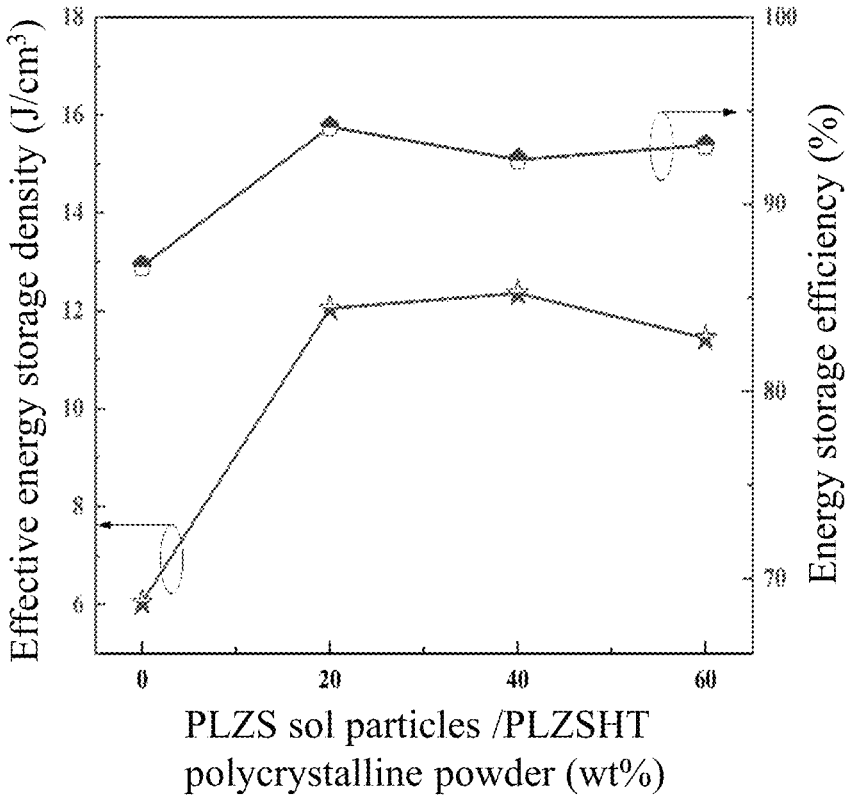
FIG. 6 is a schematic diagram illustrating energy storage performance results of ferroelectric-piezoelectric ceramic energy storage material samples obtained in embodiments 1 to 3 and a ceramic material obtained in comparison embodiment 1 according to some embodiments of the present disclosure.

FIG. 5 is a room temperature hysteresis loop diagram of ferroelectric-piezoelectric ceramic energy storage material samples obtained in embodiments 1 to 3 and a ceramic material obtained in comparison embodiment 1 according to some embodiments of the present disclosure. FIG. 6 is a schematic diagram illustrating energy storage performance results of ferroelectric-piezoelectric ceramic energy storage material samples obtained in embodiments 1 to 3 and a ceramic material obtained in comparison embodiment 1 according to some embodiments of the present disclosure. The results show that the ceramic material in comparison embodiment 1 has a breakdown field strength of 517 kV/cm, a maximum polarization intensity of 36.4 $\mu C/cm^2$, an effective energy storage density of 9.5 $J/cm^3$, and an energy storage efficiency of 95.3%. The ferroelectric-piezoelectric ceramic energy storage material in embodiment 1 has a breakdown field strength of 664 kV/cm, a maximum polarization intensity of 41.7 $\mu C/cm^2$, an effective energy storage density of 12.1 $J/cm^3$, and an energy storage efficiency of 94.1%. The ferroelectric-piezoelectric ceramic energy storage material in embodiment 2 has a breakdown field strength of 664 kV/cm, a maximum polarization intensity of 43.6 $\mu C/cm^2$, an effective energy storage density of 12.4 $J/cm^3$, and an energy storage efficiency of 92.4%. The ferroelectric-piezoelectric ceramic energy storage material in embodiment 3 has a breakdown field strength of 595 kV/cm, a maximum polarization intensity of 43.0 $\mu C/cm^2$, an effective energy storage density of 6.04 $J/cm^3$, and an energy storage efficiency of 86.7%.

Figure 7:
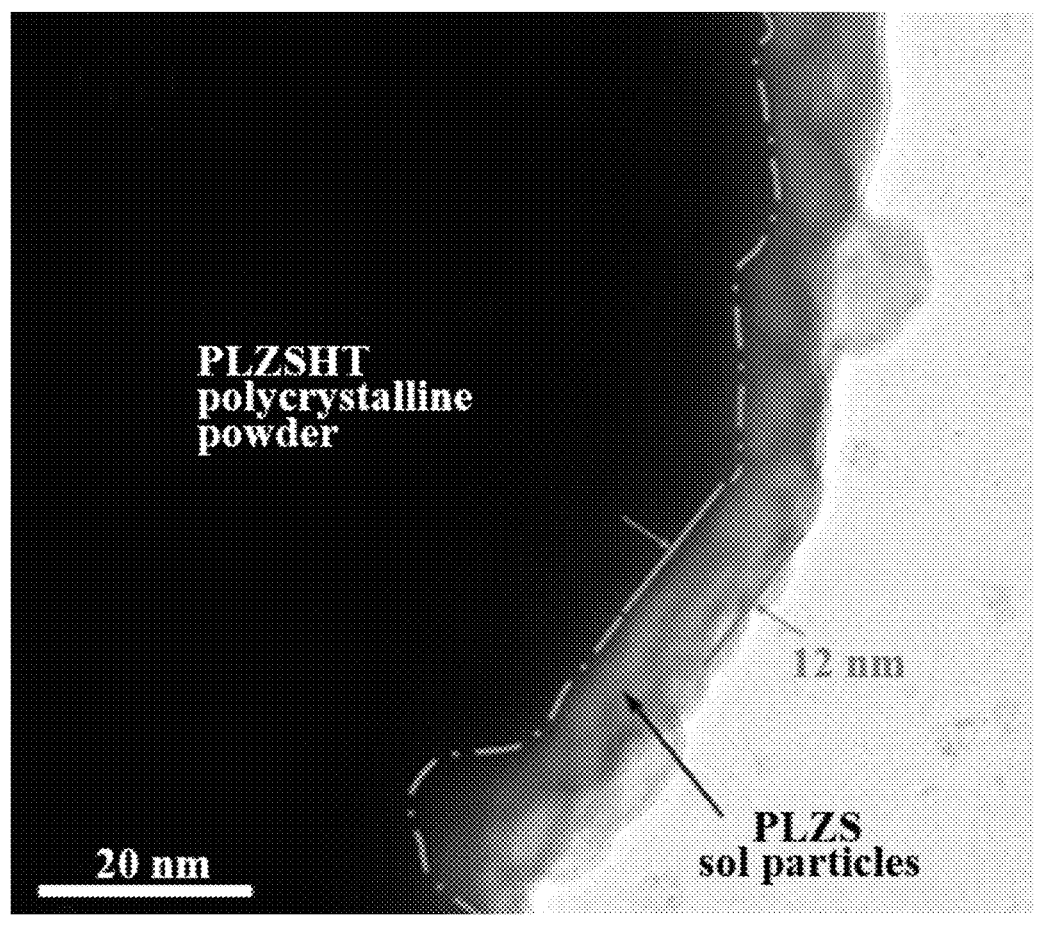
FIG. 7 is a bright-field image of micro-nano composite structured particles obtained in embodiment 2 according to some embodiments of the present disclosure.
Figure 8:
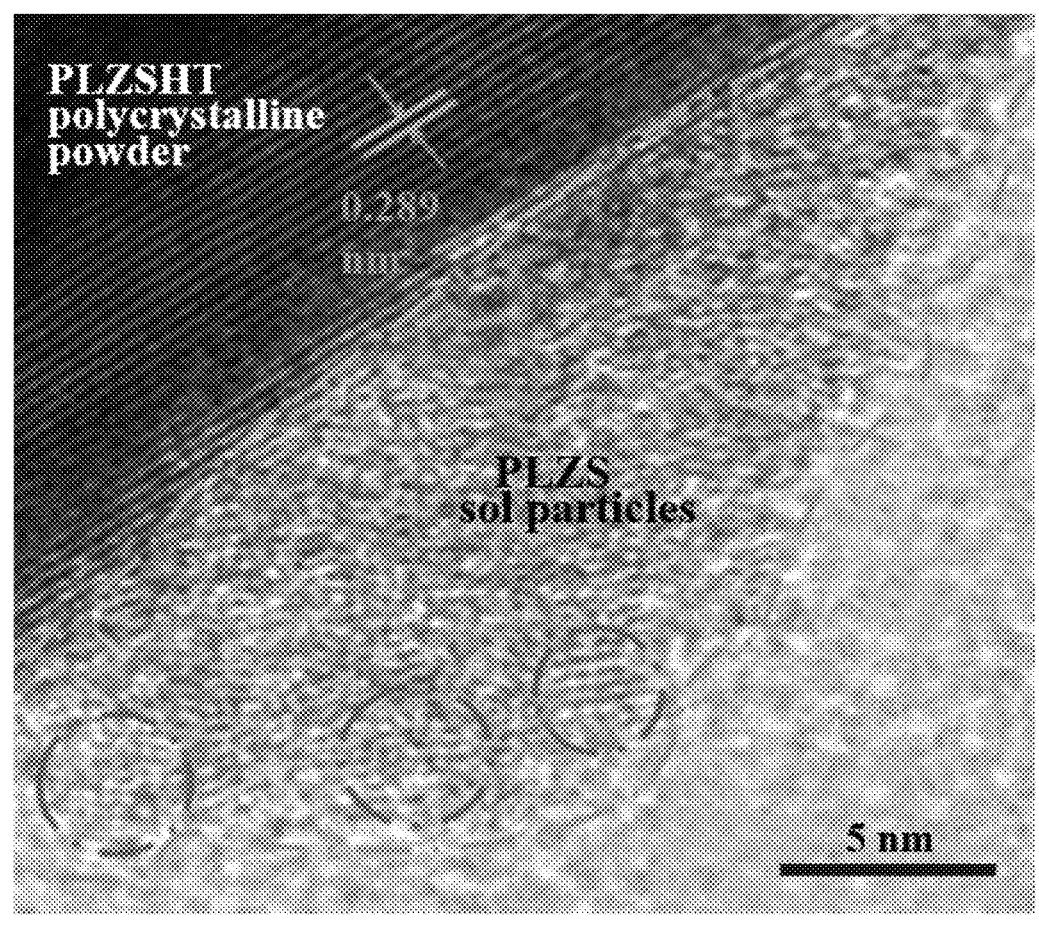
FIG. 8 is a high-resolution transmission electron microscopy (HRTEM) image of micro-nano composite structured particles obtained in embodiment 2 according to some embodiments of the present disclosure.

FIG. 7 is a bright-field image of micro-nano composite structured particles obtained in embodiment 2 according to some embodiments of the present disclosure. FIG. 8 is a high-resolution transmission electron microscopy (HRTEM)

image of micro-nano composite structured particles obtained in embodiment 2 according to some embodiments of the present disclosure. The micro-nano composite structured particles exhibit a distinct composite state consisting of two differentiated parts: one part is in a crystalline state with orderly lattice fringes, while the other part is in an amorphous mixed microcrystalline state. The sol is distributed around the exterior of polycrystalline powder.

Figure 9:
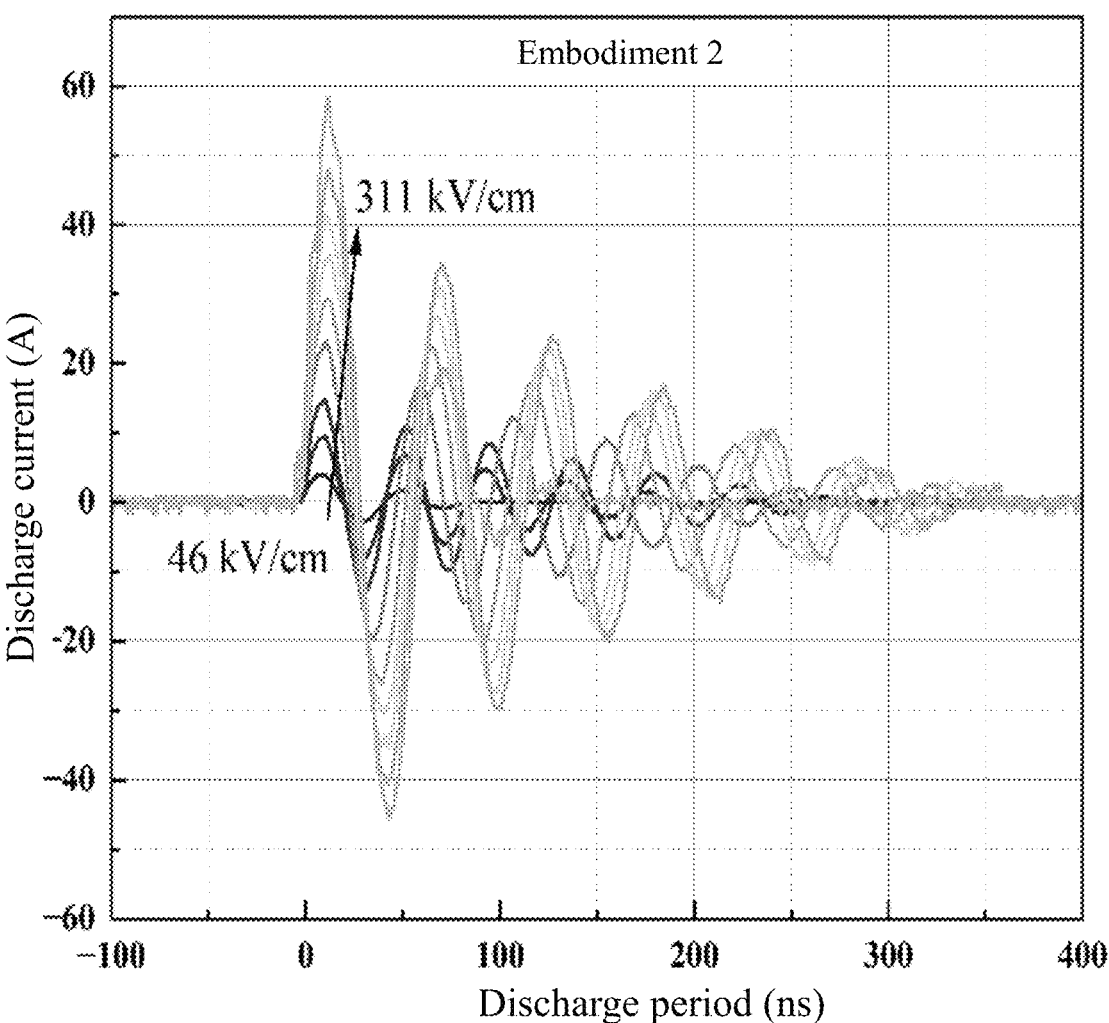
FIG. 9 is a schematic diagram illustrating an under-damped discharge current of a ferroelectric-piezoelectric ceramic energy storage material sample obtained in embodiment 2 according to some embodiments of the present disclosure.

FIG. 9 is a schematic diagram illustrating an under-damped discharge current of a ferroelectric-piezoelectric ceramic energy storage material sample obtained in embodiment 2 according to some embodiments of the present disclosure. At an electric field strength of 311 kV/cm, the ferroelectric-piezoelectric ceramic energy storage material has a power density of 289 $MW/cm^3$, a current density of 1860 $A/cm^2$, and a discharge period of 59 ns.

Therefore, according to the ferroelectric-piezoelectric ceramic energy storage material, a hybrid process preparation method, and use thereof described in some embodiments of the present disclosure, the micro-nano composite structured particles are formed by mixing and calcining the polycrystalline powder and the sol, increasing specific surface area and oxygen vacancy content, which is conducive to lowering the sintering temperature of the ceramic material and improving the dielectric energy storage performance of the ceramic material.

The basic concepts have been described above, and it is apparent to those skilled in the art that the foregoing detailed disclosure is intended as an example only and does not constitute a limitation of the present disclosure. While not expressly stated herein, various modifications, improvements, and amendments may be made to the present disclosure by those skilled in the art. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the present disclosure, such as "an embodiment", "one embodiment", and/or "some embodiments" means a feature, structure, or characteristic associated with at least one embodiment of the present disclosure. Accordingly, it should be emphasized and noted that "an embodiment" or "one embodiment", or "an alternative embodiment" in different places in the present disclosure do not necessarily refer to the same embodiment. In addition, certain features, structures, or characteristics of one or more embodiments of the present disclosure may be suitably combined.

Similarly, it should be noted that in order to simplify the presentation of the present disclosure, and thereby aid in the understanding of one or more embodiments of the invention, the foregoing descriptions of embodiments of the present disclosure sometimes group multiple features together in a single embodiment, accompanying drawings, or in a description thereof. However, this method of disclosure does not imply that more features are required for the objects of the present disclosure than are mentioned in the claims. Rather, claimed subject matter may lie in less than all features of a single foregoing disclosed embodiment.

Some embodiments use numbers to describe the number of components, attributes, and it should be understood that such numbers used in the description of the embodiments are modified in some examples by the modifiers "about", "approximately", or "substantially". Unless otherwise noted, the terms "about," "approximately," or "substantially" indicates that a +20% variation in the stated number is allowed. Correspondingly, in some embodiments, the numerical parameters used in the present disclosure and claims are approximations, which can change depending on the desired characteristics of individual embodiments. In some embodiments, the numerical parameters should consider the specified number of valid digits and employ general place-keeping. While the numerical domains and parameters used to confirm the breadth of their ranges in some embodiments of the present disclosure are approximations, in specific embodiments such values are set to be as precise as possible within a feasible range.

For each of the patents, patent applications, patent application disclosures, and other materials cited in the present disclosure, such as articles, books, specification sheets, publications, documents, or the like, are hereby incorporated by reference in their entirety into the present disclosure. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those set forth herein, the descriptions, definitions, and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A ferroelectric-piezoelectric ceramic energy storage material, comprising micro-nano composite structured particles formed by uniformly mixing polycrystalline powder with sol followed by heat treatment, wherein the micro-nano composite structured particles comprise the polycrystalline powder and a nanoscale PLZS component layer distributed around the polycrystalline powder, wherein a chemical formula of the polycrystalline powder is $(Pb_{0.94}La_{0.04})$ $(Zr_{0.51}Sn_{0.47}Hf_{0.01} Ti_{0.01})O_3$.

2. The ferroelectric-piezoelectric ceramic energy storage material of claim 1, wherein a weight ratio of the sol to the polycrystalline powder is (1-3):5.

3. The ferroelectric-piezoelectric ceramic energy storage material of claim 2, wherein a chemical formula of the nanoscale PLZS component layer is $(Pb_{0.97}La_{0.02})$ $(Zr_{0.6}Sn_{0.4})O_3$.

4. A hybrid process preparation method for the ferroelectric-piezoelectric ceramic energy storage material as claimed in claim 3, comprising:

S1, preparing the sol and the polycrystalline powder, respectively;

S2, mixing the sol and the polycrystalline powder and removing organic matter by heat treatment to obtain the micro-nano composite structured particles;

S3, mixing the micro-nano composite structured particles with a solvent, a binder, a dispersant, and a plasticizer to obtain a casting slurry; wherein the solvent is a mixture of ethanol and trichloroethylene, the binder is polyvinyl butyral, the dispersant is triethyl phosphate, the plasticizer is dibutyl phthalate;

and a mass ratio of the micro-nano composite structured particles to the solvent, the binder, the dispersant, and the plasticizer is 20:20:2:0.4:0.8;

S4, obtaining a thick film by defoaming and casting the casting slurry;

S5, obtaining a ceramic green body by shearing, stacking, and hot pressing the thick film; and S6, obtaining a ferroelectric-piezoelectric ceramic energy storage material sample by performing binder removal and sintering on the ceramic green body.

5. The method of claim 4, wherein in S1, the sol is prepared by a process including:

S111, weighing lead acetate, lanthanum acetate, zirconium n-propanol, and tin isopropanol according to a stoichiometric ratio;

S112, dissolving the lead acetate and the lanthanum acetate in acetic acid, heating to 110° C. while stirring, and cooling to obtain a solution A; dissolving the zirconium n-propanol and the tin dioxide in ethylene glycol monomethyl ether, followed by mixing and stirring to obtain a mixture, introducing acetylacetone to the mixture and stirring uniformly to obtain a solution B, wherein a molar ratio of the acetylacetone to PLZS in the sol is 1.1:1; and S113, introducing the solution B into the solution A, and mixing and stirring uniformly to obtain a mixed solution, and adjusting a concentration, a pH, and a viscosity of the mixed solution by adding deionized water, the acetic acid, and the ethylene glycol sequentially, and after stirring, adjusting a volume of the mixed solution with the acetic acid to obtain the sol, wherein the concentration of the mixed solution is in a range of 0.027 g/mL to 0.08 g/mL, the pH of the mixed solution is in a range of 3 to 5, and the viscosity of the mixed solution is in a range of 7 cP to 9 cP.

6. The method of claim 4, wherein in S1, the polycrystalline powder is prepared by a process including:

S121, mixing lead tetroxide, lanthanum trioxide, zirconium dioxide, tin dioxide, hafnium dioxide, and titanium dioxide according to a stoichiometric ratio and performing a first ball milling to obtain a first mixture, wherein a time of the first ball milling is in a range of 20 h to 30 h;

S122, drying the first mixture, and pre-sintering the first mixture at a temperature of 900° C. with a holding time of 1 h to 3 h, and cooling the first mixture to room temperature in a furnace to obtain a pre-sintered mixture; and S123, performing a second ball milling on the pre-sintered mixture to obtain a second mixture, and drying the second mixture to obtain the polycrystalline powder, wherein a time of the second ball milling is in a range of 20 h to 30 h.

7. The method of claim 4, wherein in S2, a temperature of the heat treatment is 600° C., a holding time of the heat treatment is in a range of 5 h to 7 h, and the micro-nano composite structured particles are cooled to room temperature in a furnace.

8. The method of claim 4, wherein in S6, a temperature of the binder removal is 600° C., a holding time of the binder removal is in a range of 7 h to 10 h, a debinded ceramic green body is cooled to room temperature in a furnace, a temperature of the sintering is in a range of 1100° C. to 1130° C., a holding time of the sintering is 3 h, and a sintered ceramic green body is cooled to room temperature in a furnace.

* * * * *